United States Patent [19]
Rourke

[11] Patent Number: 5,622,650
[45] Date of Patent: Apr. 22, 1997

[54] EMULSIFYING MILLING MACHINE AND PROCESS FOR EMULSIFYING

[75] Inventor: John K. Rourke, Chillicothe, Ohio

[73] Assignee: The Mead Corporation, Dayton, Ohio

[21] Appl. No.: 528,774

[22] Filed: Sep. 15, 1995

[51] Int. Cl.[6] ............................... B01F 3/08; B01F 7/00; B01J 13/00
[52] U.S. Cl. .................. 252/314; 241/39; 241/152.2; 252/312; 366/302; 366/303; 366/304
[58] Field of Search .................................. 252/312, 314; 366/135, 263, 336, 302, 303, 304, 307; 241/146, 152.2, 155

[56] References Cited

U.S. PATENT DOCUMENTS

| | | | |
|---|---|---|---|
| 1,650,088 | 11/1927 | Molin | 241/146 |
| 1,711,154 | 4/1929 | Michal | 241/146 |
| 1,807,773 | 6/1931 | Dawson | 241/261.1 |
| 2,504,678 | 4/1950 | Gardner | 366/336 |
| 2,619,330 | 11/1952 | Willems | 366/263 |
| 3,837,583 | 9/1974 | Kugelberg et al. | 241/39 |
| 4,172,668 | 10/1979 | Thompson et al. | 366/169 |
| 4,430,251 | 2/1984 | Patterson et al. | 366/349 |
| 4,767,065 | 8/1988 | Wray | 241/152.2 |
| 4,767,069 | 8/1988 | Kim | 241/152.2 |
| 4,936,518 | 6/1990 | Bernhard et al. | 241/146 |
| 5,205,647 | 4/1993 | Ricciardi | 366/176 |
| 5,370,824 | 12/1994 | Nagano et al. | 252/314 |

*Primary Examiner*—Richard D. Lovering
*Attorney, Agent, or Firm*—Thompson Hine & Flory LLP

[57] ABSTRACT

A mill for emulsifying immiscible fluids comprises a mill body having a cylindrical cavity extending therewithin, a fluid inlet at one end of the cavity and a fluid outlet near the other end, both in fluid communication with the cavity. The mill further comprises a stator having a first stator surface, and a rotor assembly having a rotor mounted on a shaft for rotation in the cavity, where the rotor has a first milling surface which faces the first stator surface. Between the first stator surface and the first milling surface is a first fluid milling space. The stator includes at least one annular row of stator projections extending from the first stator surface into the first fluid milling space, and the rotor includes at least one annular row of rotor projections extending from the first milling surface into the first fluid milling space. The annular rows of rotor projections are concentrically adjacent to the annular rows of stator projections within the first fluid milling space. The fluid inlet delivers the hydrophobic and hydrophilic fluids to the first fluid milling space, such that, upon rotating the rotor assembly, the fluids are pumped from the fluid inlet into the first fluid milling space where they are emulsified, and are then pumped from the first fluid milling space to the fluid outlet. The mill thus utilizes a single pass continuous feed process to produce fluid emulsions of a substantially uniform particle size.

15 Claims, 5 Drawing Sheets

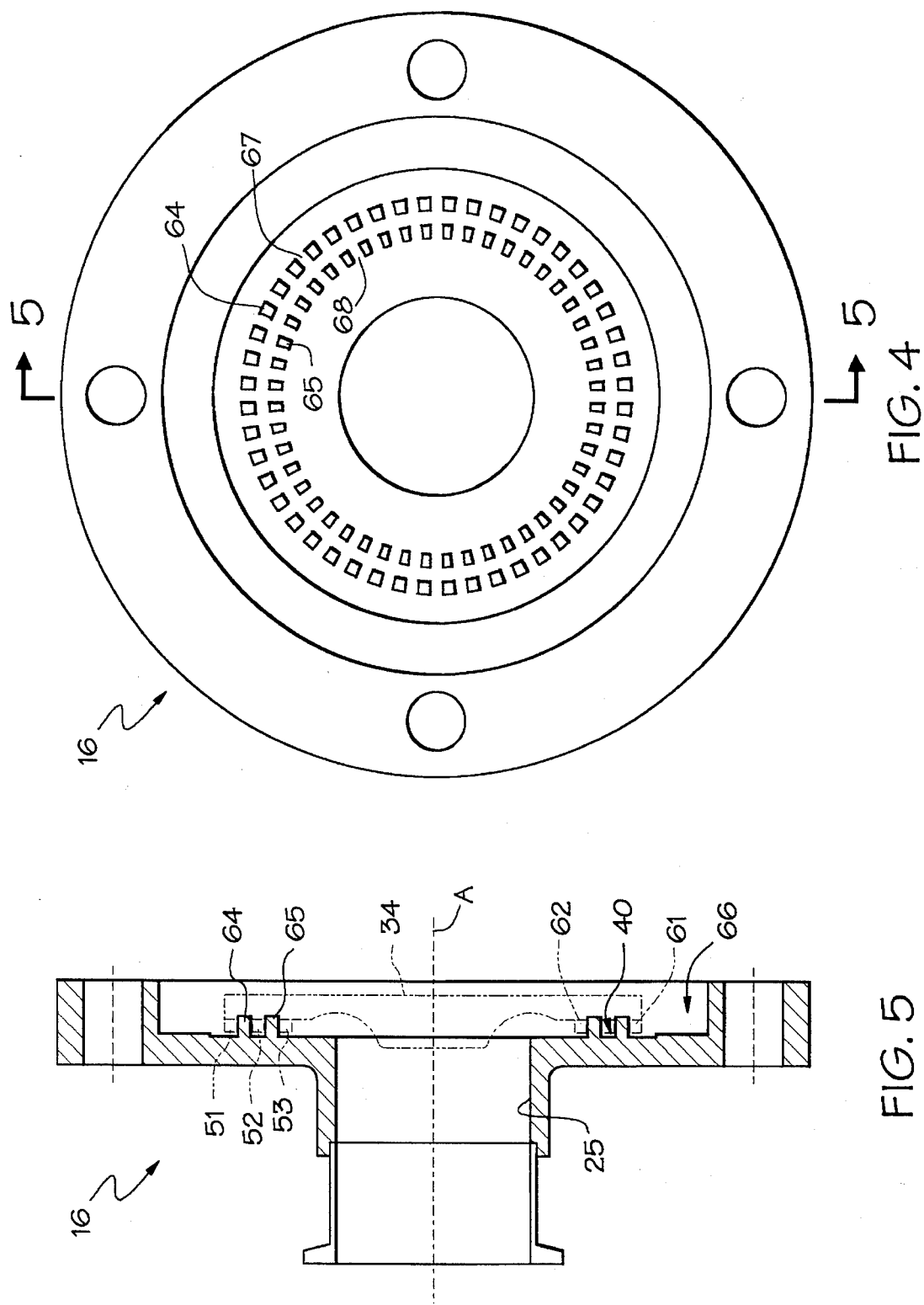

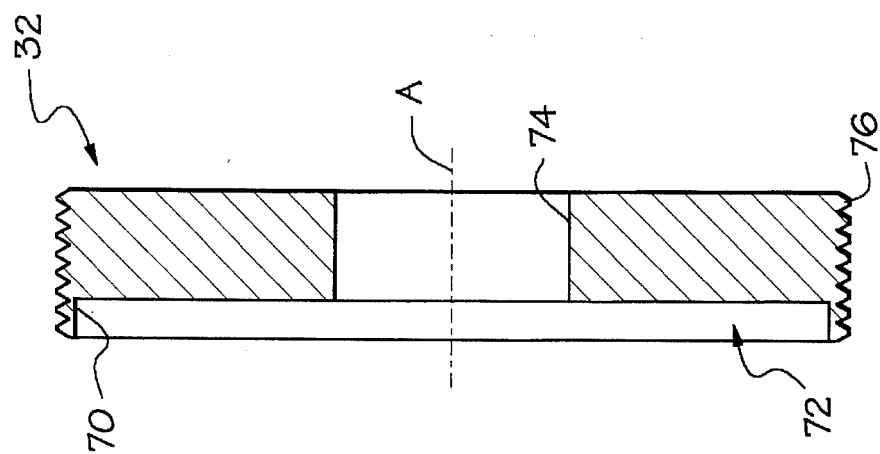
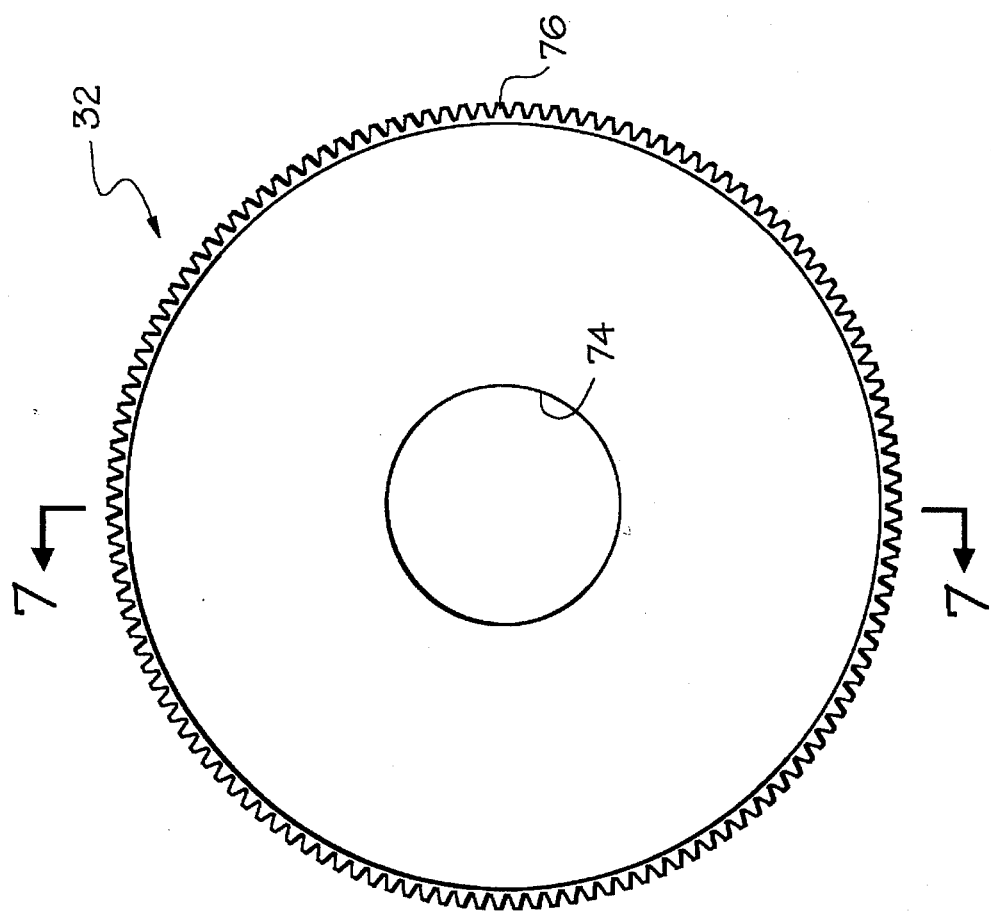

5,622,650

EMULSIFYING MILLING MACHINE AND PROCESS FOR EMULSIFYING

BACKGROUND OF THE INVENTION

The present invention concerns a milling machine for emulsifying immiscible liquids and, more particularly, a suitable mill for the continuous production of high phase ratio emulsions of a hydrophobic fluid within a hydrophilic fluid, having a uniform particle size.

The most immediate and specific application of this invention is in making emulsions for the preparation of microcapsules of a more uniform size for use in the manufacture of carbonless copy papers. The typical milling machines for emulsifying oil-in-water for use in manufacturing microcapsules, involve multiple recirculatory milling procedures. Such milling machines offer a variety of fluid pathways involving greatly varying shear fields, excessive hold up volume, and excessive dead space. Furthermore, the oil is introduced progressively, over a very wide range of phase ratio conditions during recirculation of the emulsion. Such multiple pass milling procedures invariably produce microcapsules having a very broad size distribution wherein many capsules are larger than or smaller than an optimal size.

In general, regardless of the encapsulation chemistry, overly small capsules are inefficient. They tend not to be broken by the application of imaging pressure. When they do rupture there is little sheet-to-sheet transfer of core oil. Overly large capsules, on the other hand, cannot be adequately protected from incidental rupture. They either break spontaneously when the paper is wound or they subsequently diminish the resistance of the paper to scuffing when handled. Thus the undersized and oversized microcapsules both degrade the performance and increase the cost of the product.

When using capsule wall formation based upon the interfacial polymerization of certain isocyanate compounds which have been pre-dissolved in the core oil, the wall structure begins to form substantially immediately upon exposure of the oil droplet to the external phase. After initial droplet formation, multiple pass milling may disrupt the fragile pre-wall. This could result in a broad size distribution which is undesirable. Also, the wall thickness of these microcapsules is directly proportional to the size of the core oil droplet. Overly small capsules are very weak, having a tendency to be leaky (i.e., permeable) and subject to incidental damage. Overly large capsules, though stronger, cannot be protected by the stilts in the coating matrix. For any given product, then, there is a preferred capsule size which represents the optimum balance between overall performance and cost.

Accordingly, a need exists for an improved milling machine that significantly eliminates the size distribution problems associated with the previous emulsifiers and milling machines.

SUMMARY OF THE INVENTION

The present invention is a milling machine for the production of emulsions and particularly oil-in-water emulsions which responds to the problems associated with the prior milling and emulsifying machines. The mill of the present invention produces oil-in-water emulsions in the manufacture of microcapsules of a narrow size distribution at high internal phase ratios (i.e., a high oil to water ratio), by milling the emulsions with a single pass milling process. The present invention is useful for implementing the processes disclosed in U.S. patent application Ser. No. 08/382,897; the disclosure of which is incorporated herein by reference.

The mill for emulsifying a hydrophobic and a hydrophilic fluid comprises a mill body having a substantially cylindrical cavity therein, a fluid inlet in fluid communication with the cavity at a forward end of the cavity, a fluid outlet in fluid communication with the cavity at a rear end of the cavity, and a first stator surface facing the forward end of the cavity. The mill further comprises a rotor assembly having a rotor member mounted on a shaft for rotation in the cavity.

The rotor member has a first milling surface at a forward face of the rotor member and has a second milling surface at an outer circumferential periphery of the rotor member. The first milling surface of the rotor faces the first stator surface forming a first milling space between the two surfaces. The second milling surface of the rotor faces the cylindrical inside wall of the cavity, forming an annular second milling space between these two coaxial surfaces.

The mill comprises a plurality of annular, concentric rows of stator projections (or teeth or knurls) extending from the first stator surface towards the first milling surface of the rotor and into the first milling space, and a plurality of annular, concentric rows of rotor projections extending from the first milling surface of the rotor towards the first stator surface and into the first milling space. The annular rows of stator projections are concentrically adjacent to, and are nested or intermesh within, the annular rows of rotor projections.

In a preferred embodiment, a plurality of annular rows of projections or knurls also extend from the second milling surface into the second milling space.

Also, in the preferred embodiment, the fluid inlet delivers the hydrophobic and hydrophilic fluids concentrically to a point at the hub of the rotor member, and distributes the fluids radially inside of the first milling space. The fluids entering the mill pass radially outward through the first milling space, having shear zones of increasing intensity, before reaching the outer periphery of the rotor member. The fluids flow radially through the first milling space and axially through the second milling space, within the close peripheral clearance between the knurled outer circumference of the rotor member and the inside wall of the cavity, before the fluids reach the mill outlet.

Accordingly, it is an object of the invention to provide an emulsifying mill which efficiently utilizes a single pass continuous feed process to produce fluid emulsions of a substantially uniform particle size. Other objects and advantages of the present invention will be apparent from the following description, the accompanying drawings and the appended claims.

BRIEF DESCRIPTION OF THE DRAWINGS

FIG. 4 is a rear view of the faceplate of the milling machine;

FIG. 5 is a cross-sectional view of the faceplate taken along lines 5—5 of FIG. 4, and further depicts a phantom cross-sectional image of the impeller plate in the normal operating position with respect to the faceplate;

FIG. 6 is a frontal view of the main rotor component of the four-part rotor assembly of the milling machine (i.e., without the impeller plate component attached thereto);

FIG. 7 is a cross-sectional view of the rotor taken along lines 7—7 of FIG. 6.

DETAILED DESCRIPTION

Figure 1:
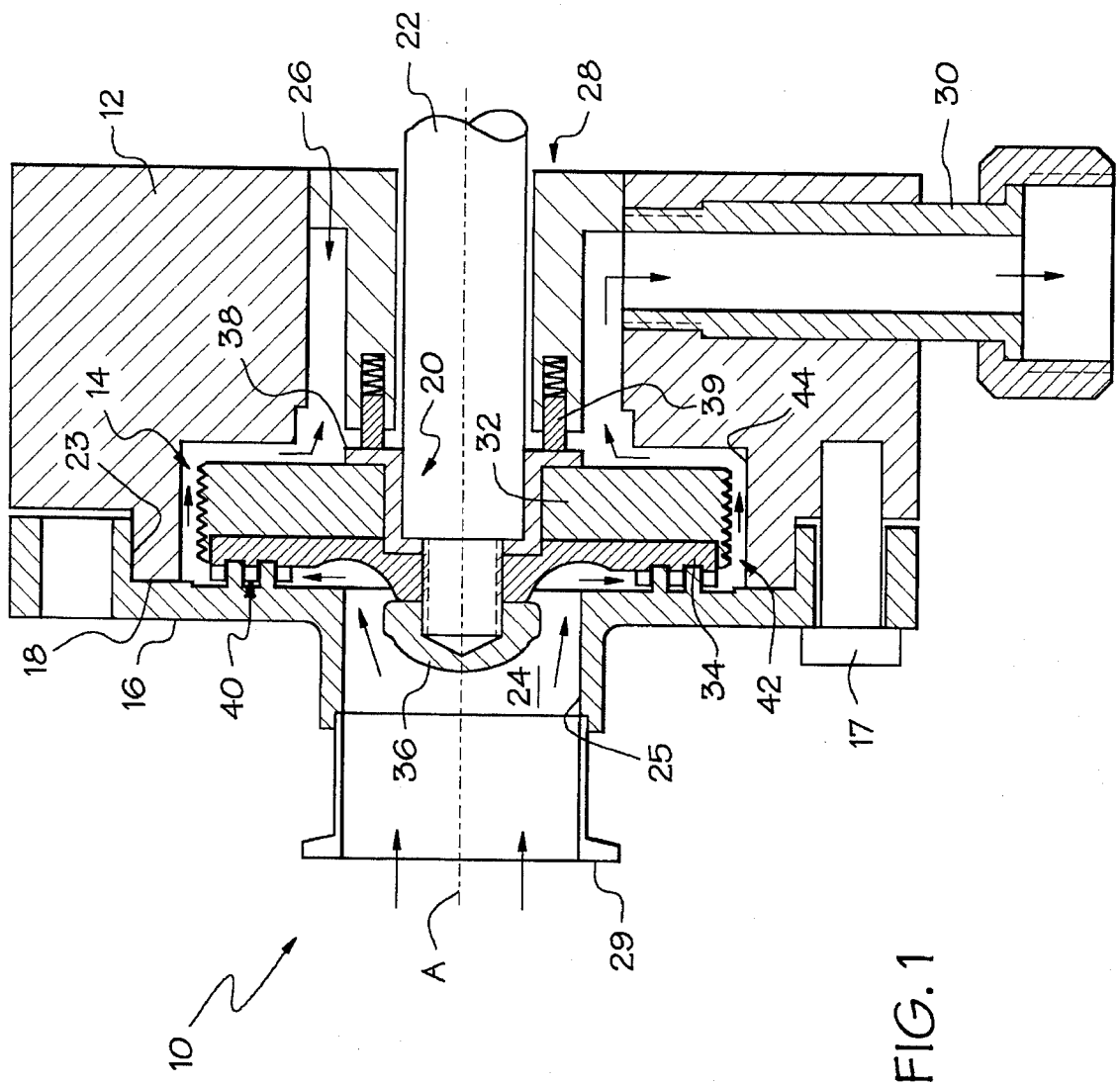
FIG. 1 is a cross sectional side view of the milling machine in accordance with the present invention.

An emulsifying milling machine, generally designated as 10, in accordance with the present invention is shown in FIG. 1. The milling machine 10 generally comprises a mill body 12 having a cylindrical cavity 14, a faceplate 16 attached to the front face 18 of the mill body, and a rotor assembly 20 rotatably supported in the cavity 14 by a rotating drive shaft 22. The faceplate 16 includes a cylindrical depression 23 which extends the cylindrical cavity 14 forward from the front face 18 of the mill body 12. The diameter of the cavity preferably ranges from 2 to 8 inches. A cover bolt 17 fastens the faceplate to the mill body.

The cylindrical cavity 14 is in fluid communication with both inlet 24 extending through hub 25 of the faceplate 16, and a cylindrical outlet chamber 26 extending through the rear portion 28 of the mill body. An inlet pipe 29 delivers fluids to the inlet 24. An outlet pipe 30 extends radially outwardly through the mill body from the chamber 26.

The rotor assembly 20 mounted on the shaft 22 generally includes a rotor 32, an impeller plate 34, a rotor cap 36 and a bushing 38. It is also within the scope of the invention that all or some of the rotor assembly members be combined to form one member. For example, the rotor 32 and impeller plate 34 can be combined, or permanently attached to form one rotor member. The shaft 22 is rotated by a motor (not shown) on axis A, which in turn simultaneously rotates the rotor 32, impeller plate 34, rotor cap 36 and rotor bushing 38 on axis A. The rotor bushing 38 provides the forward, rotating half of a mechanical seal; and an annular, spring-loaded, graphite seal 39 provides the rearward, static half of the mechanical seal.

The faceplate 16 and the impeller plate 34 define an annular milling space 40 between their respective faces, radially downstream from the inlet 24. A second annular milling space 42 is defined between the outer circumferential periphery of the rotor 32 and an inner annular stator surface 44 of the mill body 12. The pumping action of the rotor assembly 20 forces fluids entering the mill through inlet 24 to flow radially outward through milling space 40, then through milling space 42, into chamber 26, and eventually through outlet pipe 30.

Therefore, in the preferred embodiment, the milling machine 10 performs continuous feed emulsification on the fluids, and is designed to have a minimal volumetric capacity (or hold-up volume). The internal spaces have been volumetrically minimized so that there are substantially no dead spaces and there are substantially no alternate fluid pathways.

Figures 2, 3:
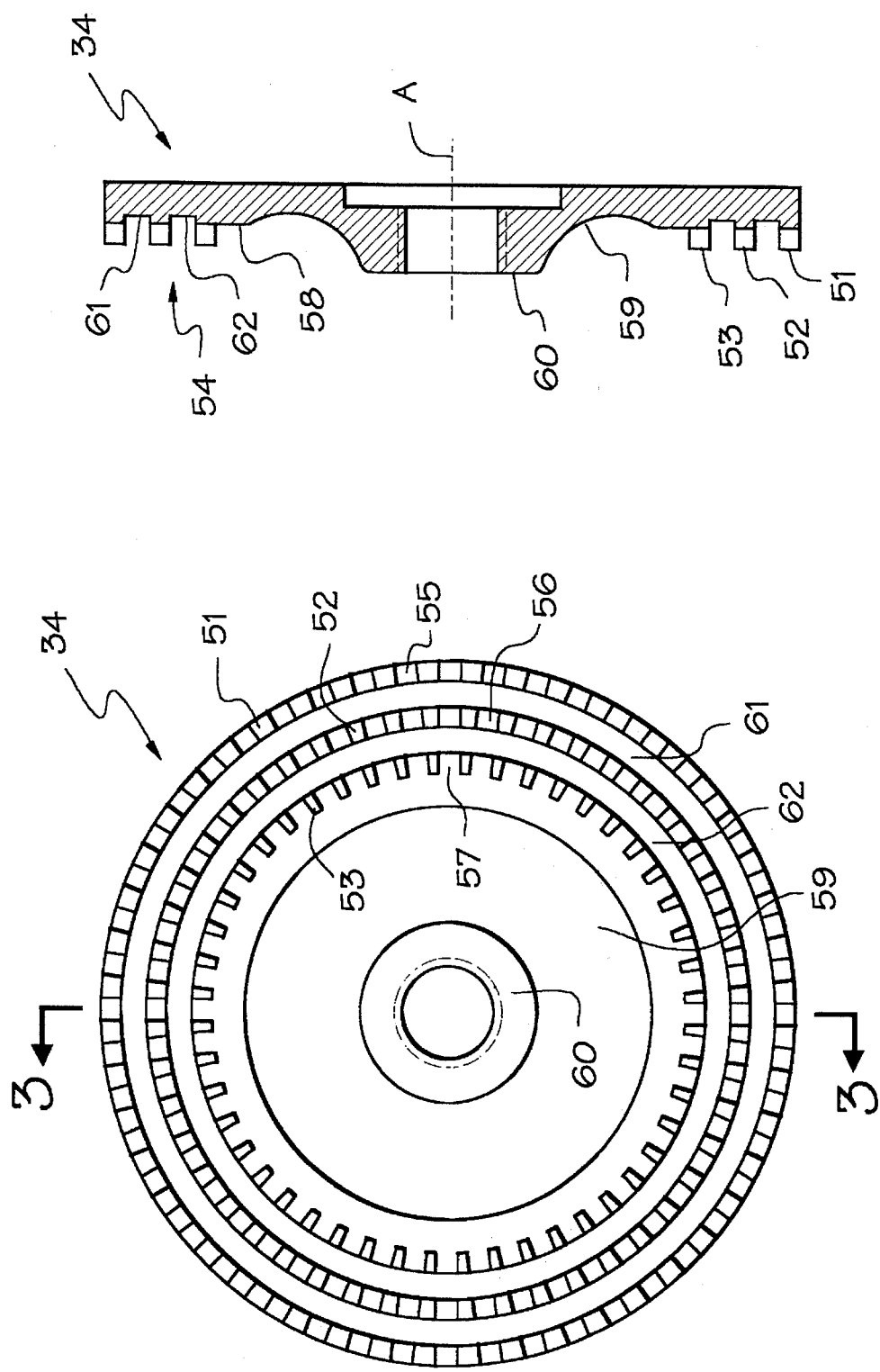
FIG. 2 is a frontal view of the impeller plate component of the four-part rotor assembly of the milling machine.
FIG. 3 is a cross-sectional view of the impeller plate taken along lines 3—3 of FIG. 2.

As shown in FIGS. 2 and 3, in one embodiment of the invention, the impeller plate 34 has three concentric annular rows of projections 51–53 extending axially from a forward face 54 of the impeller plate. The circumferential spacing of the projections 51–53 form circumferential gaps 55–57, circumferentially between the projections. The projections are substantially rectangular, are uniformly radially and circumferentially spaced, and are radially aligned. In this embodiment, each annular row of projections contains forty-eight substantially identical projections.

The amount of work and nature of shear imparted to the fluids in the mill is a function of the number, size, geometry and arrangement of the projections and the rows on the stator and rotor, and the speed of rotation. The projection layout shown in the figures is the product of maximizing the number of projections for a mill in which the cavity 14 (see FIG. 1), in the preferred embodiment, is approximately 4.25 inches in diameter. The length and width of the projections must be large enough that they are able to withstand the milling action and do not break or wear too quickly. For a rotor and stator fabricated from type 316 stainless steel, the projections are preferably about 0.05 to 0.15 inches wide circumferentially, and 0.20 to 0.25 inches long radially. The height of the projections determines the size and area of the gaps between the projections through which the fluid flows and, in turn, is one determinant of the throughput (ml/sec) capacity of the mill. Larger gaps permit a higher throughput. The height of the projections used in this embodiment of the invention ranges from about 0.15 to 0.20 inches.

Those skilled in the art will appreciate that the number, size and layout of the projections can be changed, depending on the fluids being emulsified, to adjust the amount and character of the emulsion produced by the mill. However, in order to produce a uniform particle size distribution, the projections should be designed such that each particle of the emulsion sees a substantially identical amount of shear; and further, such that the fluid flow paths through the mill are not recirculatory. Generally speaking, larger mills having larger diameter milling cavities can employ a larger number of projections arranged in larger diameter rows, and in additional rows.

As shown in FIG. 3 the rows of projections 51–53 extend from a milling surface 58 which is raised slightly with respect to an annular arcuate channel 59. Hollow hub 60 is raised substantially with respect to the channel 59 and milling surface 58. Grooves 61, 62 are located radially between the concentric rows of projections 51–53. Each annular row of projections 51–53 contains forty-eight substantially identical projections. For this embodiment, a radial cut was found most convenient for machining gaps between the projections in each row and, consequently, the projections have a trapezoidal cross-section and increase in size with their distance from center.

The impeller plate projections 51–53 perform at least two important functions when the rotor assembly 20 is rotating on axis A. The projections 51–53 rotationally accelerate fluids entering the milling space 40, thus creating a centrifugal pumping action which facilitates pumping the fluids through the milling machine 10. Secondly, the projections 51–53 provide shear surfaces for imparting work on the fluids traversing through the milling space 40, as described below.

As shown in FIGS. 4 and 5, the faceplate 16 has two annular concentric rows of stator projections 64, 65 extending axially into the milling space 40 from the rear face 66 of the faceplate 16. The circumferential spacing of the projections 64, 65 form gaps 67, 68 circumferentially between the projections. The projections are substantially trapezoidal and are uniformly radially and circumferentially spaced. In the embodiment shown here, the projections are also radially aligned and increase in size corresponding to their respective radial distance from the hub 25 of the faceplate. Each annular row of projections 64, 65 also contains forty-eight substantially identical projections. As previously mentioned, the number of projections can be varied. For this embodiment, a radial cut was found most convenient for machining the projections and, consequently, the projections have a trapezoidal cross-section and increase in size with their distance from center.

As shown in FIG. 5 the impeller plate 34 is positioned with respect to the faceplate 16 such that the annular rows of stator projections 64, 65 concentrically nest within the annular rows of impeller projections 51–53. The rows of stator projections 64, 65 are sized and shaped to nest concentrically between rows of impeller projections 51–53 and within the annular grooves 61, 62 of the impeller plate with minimal clearance.

The rows stator projections 64, 65 provide additional shear surfaces for the fluids traversing through the milling space 40. Therefore, in the preferred embodiment, as the fluids traverse the milling space 40, they are subjected to shear zones as they pass through the gaps in each row of rotor projections 51–53 and stator projections 64, 65.

As shown in FIGS. 6 and 7 the rotor 32 has an axial depression 70 cut out on its forward face 72 for receiving and attaching the impeller plate 34 (See also FIG. 1). The hollow hub 74 is for receiving the shaft 22 and rotor bushing 38.

Eight annular rows of projections 76 (which, in this embodiment, number 133 in each row) extend from the outer circumferential periphery of the rotor 32. The projections 76 are substantially pyramidal shaped and are axially aligned. The projections 76 form a knurled periphery on the outer periphery of the rotor 32 facing the annular stator surface 44; and thus form the second milling space 42 concentrically between the spinning rotor 32 and stator surface 44, which imparts additional work on the fluids traversing axially over the rotor 32 on their way to the outlet chamber 26.

Figure 8:
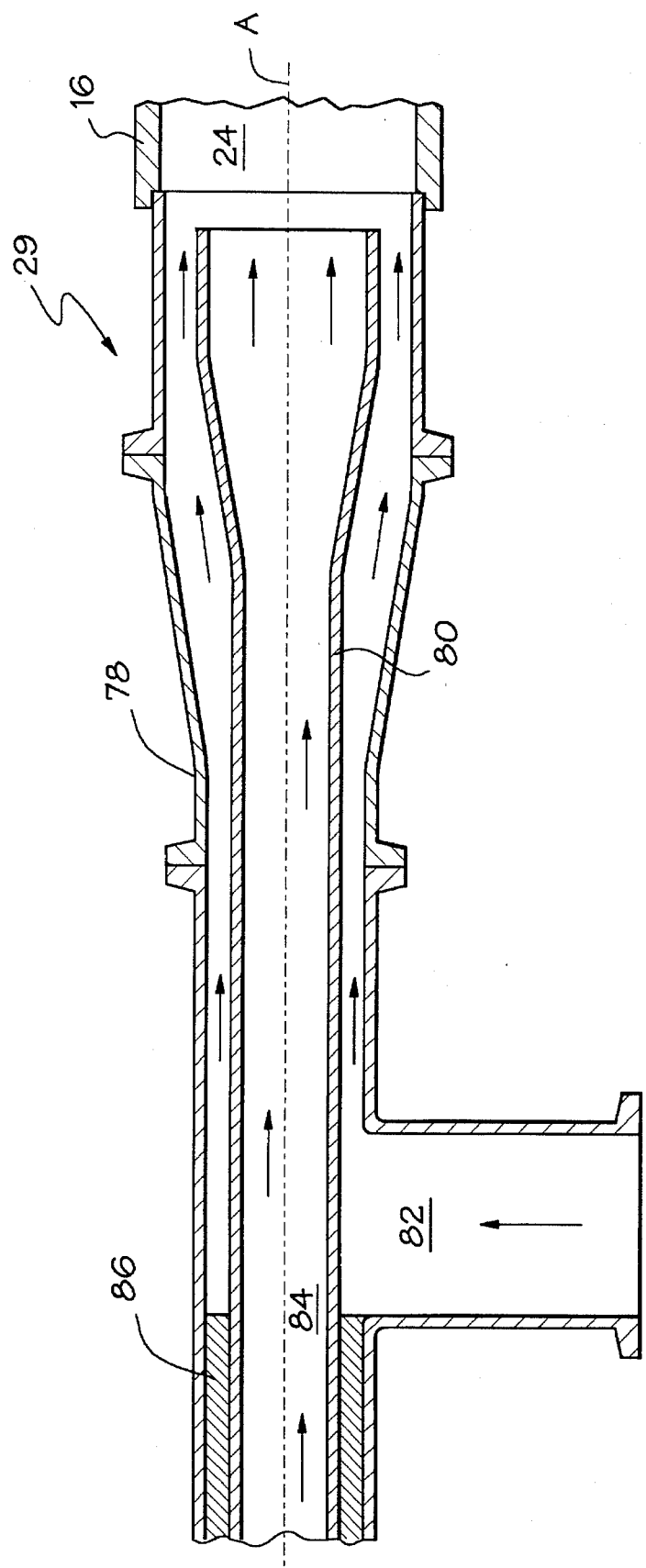
FIG. 8 is a cross-sectional side view of the inlet pipe of the milling machine.

FIG. 8 shows the preferred embodiment of the inlet pipe 29 for the mill, as attached to the faceplate 16. The inlet pipe 29 includes an outer duct 78 concentrically surrounding an inner duct 80. The water, or hydrophilic phase fluid, is introduced into the outer duct 78 through water inlet 82. The oil, or hydrophobic phase fluid, is introduced into the inner duct 80 through oil inlet 84. A fluid-tight seal 86 located concentrically between the inner duct 80 and outer duct 78, upstream of the water inlet 82, seals the hydrophobic phase fluids away from the hydrophilic phase fluids within the pipe 29 and prevents the hydrophilic phase fluids from traveling upstream. The inlet pipe 29 thus provides a smooth concentric flow of the two emulsion phases delivered coaxially to the fluid inlet 24 of the mill 10. The concentric delivery of the two inlet phases allows a high phase ratio of oil-in-water emulsions which decreases the tendency of inversion. While other methods for feeding the fluids to the mill can be used, this concentric delivery has been found to be most effective.

While not desiring to be bound, the design illustrated in FIG. 8 is believed to be effective because the hydrophobic phase is centrally introduced and is uniformly spread across and preferentially acted upon by the rotor, whereas the hydrophilic phase is uniformly spread over the uniformly layered hydrophobic phase and preferentially wets the static elements of the machine. The concentric delivery thus introduces symmetrical layers of the hydrophobic and hydrophilic fluids to the hub of the rotor such that the fluids will break up in a more uniform manner.

The rate with which the fluids are fed to the mill is less critical than the velocity of the mill and the valving of the outlet in terms of controlling the milling action. Generally the fluids will be supplied to the mill at a positive pressure such that the mill never lacks fluid for take up into the mill. The throughput can be controlled by putting a valve on the outlet and restricting the ability of the fluid to exit the mill. Generally throughput rates of about 5 to 25 lb/min are targeted. The peripheral velocity of the mill rotor is typically in a range of about 5000 to 10,000 ft/min. While rotor speed can be used to influence the emulsion uniformity and particle size, based on current experience, controlling the phase ratio of the emulsion is the preferred method of influencing such factors, as described in detail in the aforementioned U.S. patent application Ser. No. 08/382,897.

In operation, the inlet pipe 29 delivers the hydrophilic and hydrophobic phase fluids to the hub or rotor cap 36 of the rotor assembly 20 rotating on the shaft 22 on axis A. The shaft 22 is driven by a motor (not shown). The rotating impeller projections 51–53 centrifugally force the fluids radially outward from the inlet 24 and thus create a pumping action for pumping the fluids from the inlet pipe 29 to the outlet pipe 30. Therefore, the fluids are forced to travel radially outwardly through annular milling space 40, axially through annular milling space 42, into chamber 26, and out through outlet pipe 30.

When the fluids enter annular milling space 40, concentrically nested rotating impeller projections 51–53 and static stator projections 64, 65 form shear zones. The fluids encounter a shear zone each time the fluids enter a rotating impeller projection gap (55, 56 or 57) or a static stator projection gap (67 or 68). Because the impeller projections increase in tangential velocity in proportion to their radial distance from axis A, the fluids entering the milling space 40 pass through shear zones of increasing intensity as the fluids travel radially outwardly to the outer periphery of the rotor assembly 20.

Once the fluids reach the outer periphery of the rotor assembly 20, they are then forced into the annular milling space 42. The tangential velocity of the knurled projections 76 impart additional work on the fluids before the fluids can escape into the chamber 26.

The invention thus has the ability to produce oil in water emulsions and, accordingly, microcapsules of extraordinarily narrow size distributions, at extremely high internal phase ratios, by providing single-pass milling and continuous flow. The improved control of the emulsion particle size furnished by the invention will also benefit a number of other endeavors including the production of many pharmaceuticals, herbicides, pesticides, flavors and scents.

What is claimed is:

1. A mill for emulsifying a first fluid and a second fluid comprising:

a mill body having a cylindrical cavity therein, a fluid inlet at one end of said cavity in fluid communication with said cavity, and a fluid outlet axially removed from said fluid inlet end of said cavity in fluid communication with said cavity;

a first stator surface at said fluid inlet end of said cavity;

a rotor assembly including a rotor mounted on a shaft for rotation in said cavity and having a first milling surface facing said first stator surface;

a first milling space between said first milling surface and said first stator surface;

a plurality of stator projections extending from said first stator surface into said first milling space; and a plurality of rotor projections extending from said first milling surface into said first milling space;

said fluid inlet delivering the fluids to said first milling space where the fluids are worked on by said rotor to form an emulsion;

said rotor assembly rotates on an axis;

said stator projections are arranged in a plurality of concentric annular rows and increase in size in proportion to their radial distance from said axis;

said rotor projections are arranged in a plurality of concentric annular rows and increase in size in proportion to their radial distance from said axis; and each of said annular rows of rotor projections concentrically alternate with each of said annular rows of stator projections;

whereby the fluids pass through shear zones of increasing intensity as they travel radially outward through said first milling space.

2. A mill for emulsifying a hydrophobic fluid and a hydrophilic fluid comprising:

a mill body having a substantially cylindrical cavity therein, a fluid inlet in fluid communication with said cavity approximate said forward end of said cavity, a fluid outlet in fluid communication with said cavity approximate a rear end of said cavity, a first stator surface facing on said forward end of said cavity, and a cylindrical second stator surface facing on a circumferential portion of said cavity;

a rotor assembly including a rotor mounted on a shaft for rotation in said cavity, said rotor having a first milling surface at a forward end thereof and having a second milling surface at an outer circumferential periphery thereof, said first milling surface facing said first stator surface and said second milling surface facing said second stator surface;

a plurality of annular, concentric rows of stator projections extending from said first stator surface towards said first milling surface;

a first plurality of annular, concentric rows of rotor projections extending from said first milling surface towards said first stator surface; and a second plurality of annular rows of rotor projections extending from said second milling surface towards said second stator surface;

each of said annular rows of said stator projections being concentrically adjacent to an annular row of said first plurality of rows of rotor projections; and said fluid inlet delivers the hydrophobic and hydrophilic fluids to a space axially between said first stator surface and said first milling surface, and upon rotating said rotor, said fluids are emulsified in the mill and pumped to said fluid outlet.

3. The mill of claim 2, further comprising:

an inner duct for supplying the hydrophobic fluid to said fluid inlet; and an outer duct for supplying the hydrophilic fluid to said fluid inlet;

said outer duct concentrically surrounding said inner duct;

whereby the fluid inlet delivers a concentric flow of the hydrophobic and hydrophilic fluids coaxially to the cavity.

4. A mill for emulsifying a first fluid and a second fluid comprising:

a mill body having a cylindrical cavity therein, a fluid inlet at one end of said cavity in fluid communication with said cavity, and a fluid outlet axially removed from said fluid inlet end of said cavity in fluid communication with said cavity;

a first stator surface at said fluid inlet end of said cavity;

a rotor assembly including a rotor mounted on a shaft for rotation in said cavity and having a first milling surface facing said first stator surface;

a first milling space between said first milling surface and said first stator surface;

a plurality of substantially rectangular stator projections extending from said first stator surface into said first milling space, and arranged in a plurality of concentric annular rows;

a plurality of substantially rectangular rotor projections extending from said first milling surface into said first milling space, and arranged in a plurality of concentric annular rows;

a cylindrical second stator surface facing said cavity;

a cylindrical second milling surface, positioned on said rotor, facing said second stator surface;

a second milling space defined between said second milling surface and said second stator surface; and a plurality of milling projections extending into said second milling space from at least one of said second milling surface and said second stator surface;

said fluid inlet delivering the fluids to said first milling space where the fluids are worked on by said rotor to form an emulsion;

each of said annular rows of rotor projections concentrically alternate with each of said annular rows of stator projections; and said annular rows of stator projections and said annular rows of rotor projections being circumferentially spaced and radially aligned.

5. The mill of claim 4, wherein said emulsion is fed to said fluid outlet from said second milling space.

6. The mill of claim 5, wherein said milling projections extend from said second milling surface and are arranged in a plurality of annular rows.

7. The mill of claim 6, wherein said rows of milling projections are circumferentially spaced and axially aligned.

8. The mill of claim 7, wherein said milling projections are substantially pyramidal shaped.

9. A mill for emulsifying a first fluid and a second fluid comprising:

a mill body having a cylindrical cavity therein, a fluid inlet at one end of said cavity in fluid communication with said cavity, and a fluid outlet axially removed from said fluid inlet end of said cavity in fluid communication with said cavity;

a first stator surface at said fluid inlet end of said cavity, facing onto said fluid end of said cavity;

a rotor assembly including a rotor mounted on a shaft for rotation in said cavity and having a first milling surface facing said first stator surface;

a first milling space between said first milling surface and said first stator surface;

a plurality of stator projections extending from said first stator surface into said first milling space and arranged in at least one annular row;

a plurality of rotor projections extending from said first milling surface into said first milling space and arranged in at least one annular row;

a second stator surface facing onto a circumferential portion of said cavity;

an outer circumferential rotor surface;

a second milling space defined between said second stator surface and said outer circumferential rotor surface, said second milling space being in fluid communication with said first milling space and said fluid outlet; and a plurality of milling projections extending from at least one of said second stator surface and said outer circumferential rotor surface;

said fluid inlet delivering the fluids to said first milling space where the fluids are worked on by said rotor to form an emulsion; and each of said annular rows of rotor projections concentrically alternate with each of said annular rows of stator projections.

10. A mill for emulsifying a first fluid and a second fluid comprising:

a mill body having a cylindrical cavity therein, a fluid inlet at one end of said cavity in fluid communication with said cavity, and a fluid outlet axially removed from said fluid inlet end of said cavity in fluid communication with said cavity;

a first stator surface at said fluid inlet end of said cavity;

a rotor assembly including a rotor mounted on a shaft for rotation in said cavity and having a first milling surface facing said first stator surface;

a first milling space between said first milling surface and said first stator surface;

a plurality of stator projections extending from said first stator surface into said first milling space;

a plurality of rotor projections extending from said first milling surface into said first milling space;

an inner duct for supplying one of the first and second fluids to said fluid inlet; and an outer duct for supplying the other of the first and second fluids to said fluid inlet;

said outer duct surrounding said inner duct; and said fluid inlet delivering the first and second fluids to said first milling space where the first and second fluids are worked on by said rotor to form an emulsion.

11. A process for emulsifying a hydrophobic fluid and a hydrophilic fluid comprising the steps of:

introducing hydrophobic and hydrophilic fluids into a first milling space between a rotor and a stator, while rotating said rotor with respect to said stator; and introducing fluid effluent from said first milling space into a second circumferential milling space at an outer periphery of said rotor;

said stator including at least one annular row of stator projections extending from said stator into said first milling space;

said rotor including at least one annular row of rotor projections extending from said rotor into said first milling space and at least one row of milling projections extending radially into said second milling space; and each of said annular rows of stator projections being concentrically adjacent to an annular row of rotor projections.

12. The method of claim 11, wherein:

said stator includes a concentrically arranged plurality of said annular rows of stator projections, and said rotor includes a concentrically arranged plurality of said annular rows of rotor projections and a plurality of said annular rows of milling projections.

13. The method of claim 12, further including the steps of:

substantially prohibiting the fluids from residing in a dead space; and allowing the fluids to cycle only once through said first and second milling spaces.

14. A process for emulsifying a hydrophobic fluid and a hydrophilic fluid comprising the steps of:

introducing hydrophobic and hydrophilic fluids into a first milling space between a rotor and a stator, while rotating said rotor with respect to said stator; and delivering the hydrophobic and hydrophilic fluids separately into said first milling space through concentric ducts, such that the hydrophobic fluids are preferentially delivered for contact with said rotor and the hydrophilic fluids are preferentially delivered for contact with said stator;

said stator including at least one annular row of stator projections extending from said stator into said first milling space;

said rotor including at least one annular row of rotor projections extending from said rotor into said first milling space; and each of said annular rows of stator projections being concentrically adjacent to an annular row of rotor projections.

15. A process for emulsifying a hydrophobic fluid and a hydrophilic fluid comprising the step of:

introducing hydrophobic and hydrophilic fluids into a first milling space between a rotor and a stator, while rotating said rotor with respect to said stator;

said rotor assembly rotates on an axis;

said stator including a plurality of concentric annular rows of stator projections extending from said stator into said first milling space, said stator projections increase in size in proportion to their radial distance from said axis;

said rotor including a plurality of concentric annular rows of rotor projections extending from said rotor into said first milling space, said rotor projections increase in size in proportion to their radial distance from said axis; and each of said annular rows of stator projections being concentrically adjacent to an annular row of rotor projections;

whereby the fluids pass through shear zones of increasing intensity as they travel radially outward through said first milling space.

* * * * *